United States Patent
Shaw

(10) Patent No.: US 7,578,646 B2
(45) Date of Patent: Aug. 25, 2009

(54) ANCHORING SYSTEM FOR MOTORIZED AND NON-MOTORIZED CRAFT

(76) Inventor: Michael B. Shaw, 1030 A Cherry Ct., Hollister, CA (US) 95023

( * ) Notice: Subject to any disclaimer, the term of this patent is extended or adjusted under 35 U.S.C. 154(b) by 397 days.

(21) Appl. No.: 11/420,201

(22) Filed: May 24, 2006

(65) Prior Publication Data

US 2006/0275094 A1    Dec. 7, 2006

Related U.S. Application Data

(60) Provisional application No. 60/687,533, filed on Jun. 3, 2005.

(51) Int. Cl.
*B60P 7/08* (2006.01)
(52) U.S. Cl. .................. 410/123; 410/128; 410/151; 410/154; 410/155
(58) Field of Classification Search .............. 410/2, 410/3, 7, 10, 11, 12, 19, 23, 97, 100; 224/403, 224/543; 248/499
See application file for complete search history.

(56) References Cited

U.S. PATENT DOCUMENTS

| | | | |
|---|---|---|---|
| 4,243,243 A | 1/1981 | Edmisten | 280/446 |
| 5,326,202 A | 7/1994 | Stubbs | 410/3 |
| 5,423,644 A | 6/1995 | First, Sr. | 410/100 |
| 6,171,034 B1 | 1/2001 | Burgoon et al. | 410/3 |
| 6,524,041 B1 | 2/2003 | Voiculescu | 410/100 |
| 6,705,811 B1 | 3/2004 | Selby | 410/3 |
| 6,761,519 B2 | 7/2004 | Alderman | 410/3 |
| 6,805,522 B2 | 10/2004 | Condon | 410/3 |
| 6,932,550 B1 | 8/2005 | Hope | 410/3 |
| 6,966,732 B2 | 11/2005 | Gohata | 410/3 |
| 7,025,549 B1 | 4/2006 | Vandament et al. | 410/100 |
| 7,322,780 B2 * | 1/2008 | Hill | 410/97 |
| 2003/0143051 A1 | 7/2003 | Jackson, Sr. | 410/3 |

* cited by examiner

*Primary Examiner*—Stephen Gordon
(74) *Attorney, Agent, or Firm*—Zilka-Kotab, PC

(57) ABSTRACT

An anchoring system for a craft according to one embodiment includes a first portion for forming a first loop around a handlebar, the first portion having a free end; a second portion for forming a second loop around the handlebar, the second portion having a free end; and a cross member extending between the first and second portions, wherein a length of the cross member is selectively adjustable. Tension exerted on the free end of the first portion causes the first loop to exert a wrapping force on the handlebar when wrapped therearound. Tension exerted on the free end of the second portion causes the second loop to exert a wrapping force on the handlebar when wrapped therearound.

22 Claims, 4 Drawing Sheets

ANCHORING SYSTEM FOR MOTORIZED AND NON-MOTORIZED CRAFT

RELATED APPLICATIONS

The present invention claims priority to U.S. Provisional Patent Application Ser. No. 60/687,533, filed Jun. 3, 2005.

FIELD OF THE INVENTION

The present invention relates to anchoring systems for transportation devices, and more particularly, this invention relates to an anchoring system that attaches to the handles, grips or other pans of a handlebar of motorized and non-motorized craft such as a motorcycle.

BACKGROUND OF THE INVENTION

Vehicles such as motorcycles and bicycles, are typically transported on trailers, in the back of pickup trucks, in a box van, the bottom of a transportation crate, etc. As shown in FIG. 1, tie-down straps 100 are typically used to secure the transported vehicle 102 in the truck, trailer or other transporting vehicle 104. Tie-down straps typically consist of a pair of nylon straps and interconnected by a tensioning, device 106, such as a clamp or ratcheting assembly. Hooks 108 are attached to the distal ends of the straps. In use with a motorcycle, for example, the typical practice is to place one hook on the motorcycle steering handle bar 110, and attach the other hook to an eyelet or other attachment point on the transporting vehicle. This method is repeated using a second tie-down strap on the opposite side of the motorcycle. When tension is applied to both tie-down straps, the vehicle's front suspension is compressed, creating retaining force against the surface of the transporting vehicle. This spring-like tension holds the motorcycle securely in place for transport.

Utilizing the motorcycle's handlebar as an attachment point for a tie-down strap has several, disadvantages. When the vehicle is transported, vibration and motion will cause the nylon strap or hook to rub against various components on the motorcycle or ATV, potentially causing damage at these locations. Damage to electrical wires, control cables, body fairings and even the handlebars themselves is common, creating additional operating expense as well as potential safety hazards resulting from component failure.

Worse, during transportation tie-down straps tend to wander and work their way up to the top of the handlebars where the levers, brake reservoirs brake lines and kill switch are located. This wandering exerts unnecessary forces on the various components.

Furthermore, as the tie-down hook slides along the handlebar the tensioning force is loosened, thereby creating the possibility of losing the transported vehicle.

There is therefore a need for an improved anchoring system that avoids the aforementioned problems.

SUMMARY OF THE INVENTION

An anchoring system for a craft according to one embodiment of the present invention includes a first portion for forming a first loop around a handlebar the first portion having a free end; a second portion for forming a second loop around the handlebar, the second portion having a free end; and a cross member extending between the first and second portions, wherein a length of the cross member is selectively adjustable. Tension exerted on the free end of the first portion causes the first loop to exert a wrapping force on the handlebar when wrapped therearound. Tension exerted on the free end of the second portion causes the second loop to exert a wrapping force on the handlebar when wrapped therearound.

An anchoring system for a craft according to another embodiment of the present invention includes a first portion for forming a first loop around a handlebar, the first portion having a free end, a second portion for forming a second loop around the handlebar, the second portion having a free end, and a cross member extending between the first and second portions and coupled thereto, where a length of the cross member is selectively adjustable. The cross member is selectably positionable along at least one section of the first and second loops.

An anchoring system for a craft according to yet another embodiment of the present invention includes a first portion for forming a first loop around a handlebar, the first portion having a free end. Also present is a second portion for forming a second loop around the handlebar, the second portion having a free end. A cross member extends between the first and second portions and is coupled to them. A length of the cross member is selectively adjustable. The first portion further includes a fixed loop, where the first loop is formed by wrapping the free end of the first portion around the handlebar and through the fixed loop of the first portion. The second portion further includes a fixed loop, where the second loop is formed by wrapping the free end of the second portion around the handlebar and through the fixed loop of the second portion.

Other aspects and advantages of the present invention will become apparent from the following detailed description, which, when taken in conjunction with the drawings illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

Figure 1:
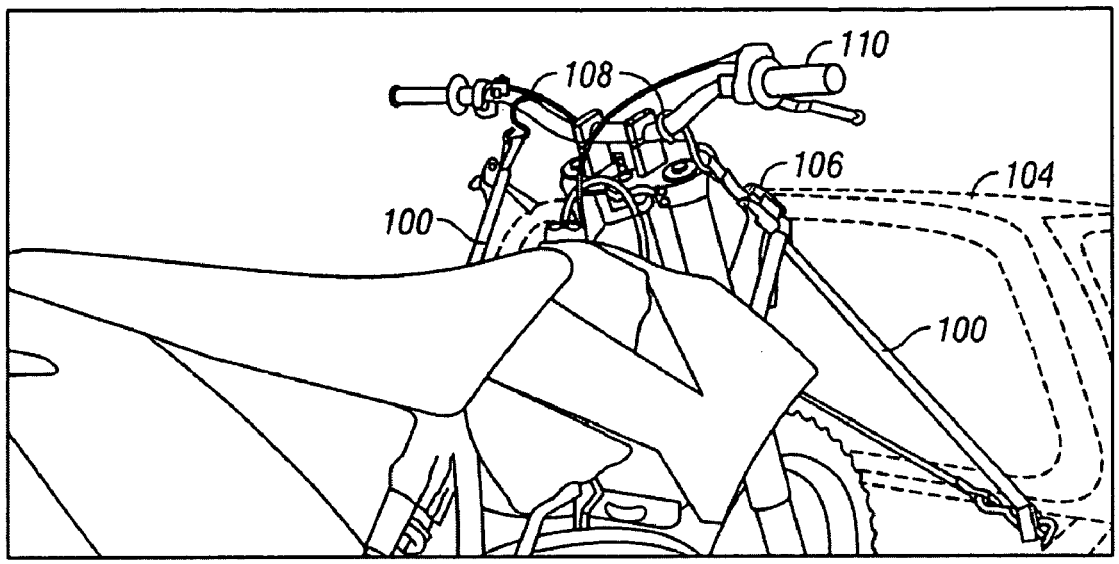
FIG. 1 is a perspective view of a motorcycle tied down to a pickup bed using a traditional tie-down strap.

The following description is the best node present contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent features are given like reference numerals.

Disclosed herein is an anchoring system for motorized and non-motorized craft such as motorcycles, mopeds, scooters, bicycles, All Terrain Vehicles (ATVs), watercraft snow mobiles, and other types of craft having handlebars. Such craft are typically transported on trailers, in the back of pickup trucking, in box vans, in the bottom of transportation crates, etc. The anchoring system disclosed herein is compatible with all such craft and the mechanism, for transporting them.

Figure 2:
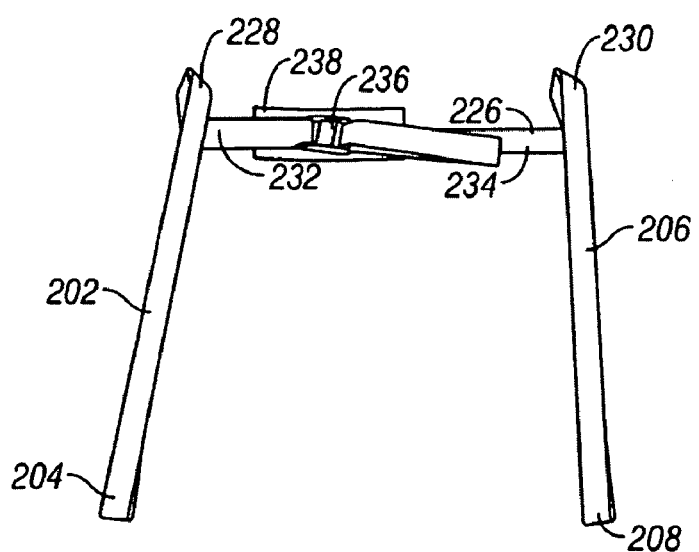
FIG. 2 is a side view of an anchoring system according to one embodiment of the present invention.
Figure 3:
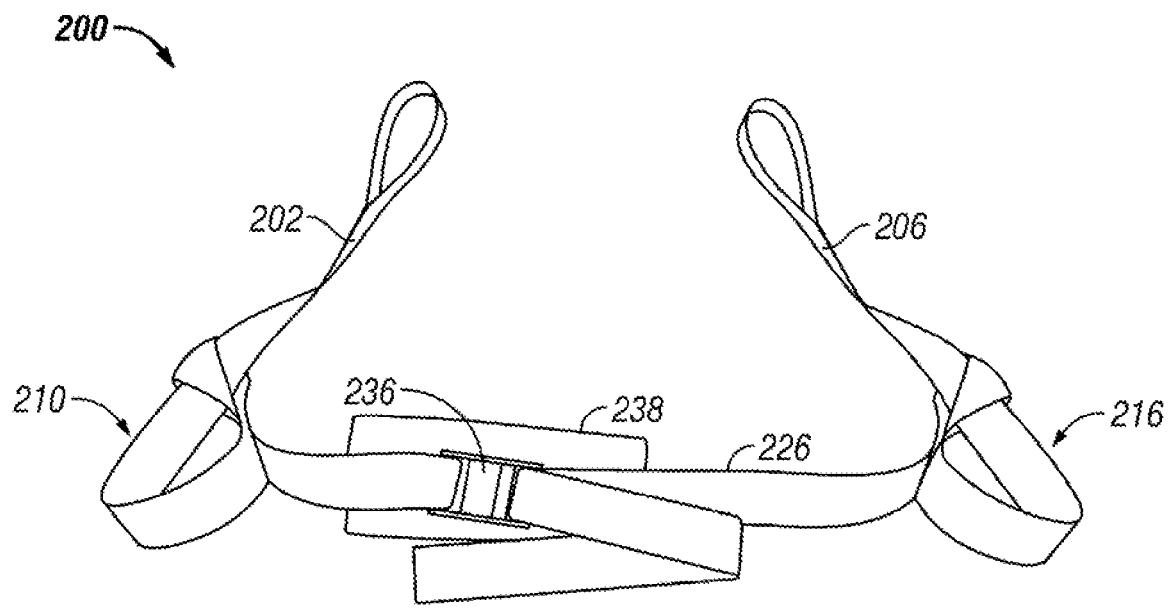
FIG. 3 is a side view of an anchoring system according to one embodiment of the present invention.
Figure 4:
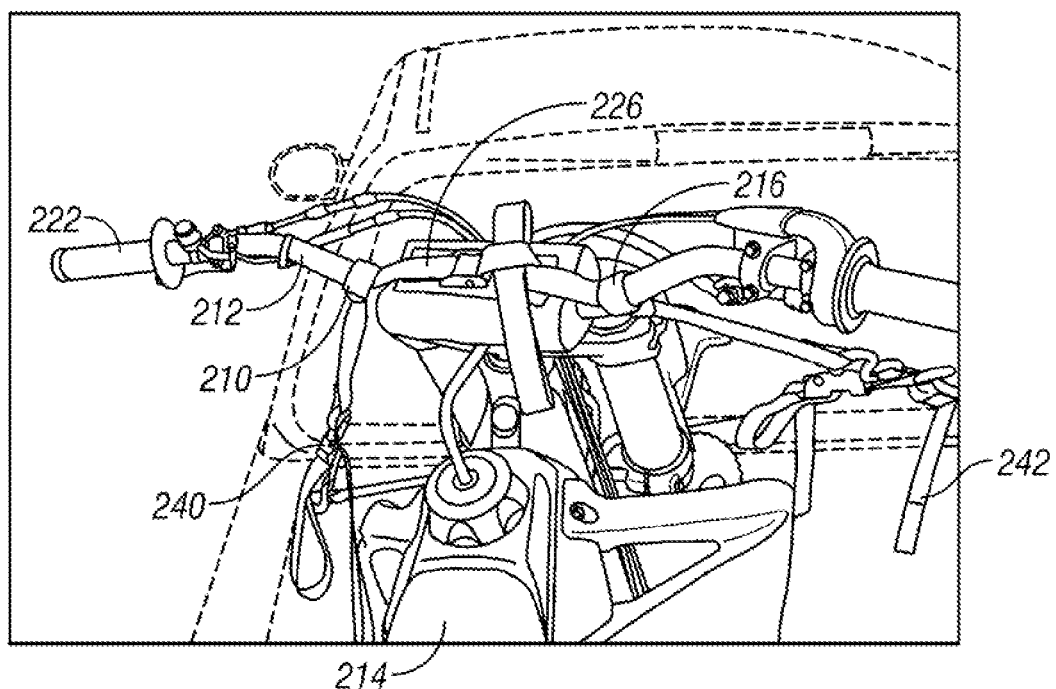
FIG. 4 is a perspective view of the anchoring system of FIGS. 2 and 3 in use.

FIGS. 2 and 3 illustrate an anchoring system 200 for a craft according to one embodiment of the present invention. FIG. 4 illustrates the anchoring system if FIGS. 2 and 3 in use. As shown, the anchoring system includes a first portion 202 having a free end 204, and a second portion 206 having a free end 208.

Referring to FIGS. 3 and 4, the first portion is capable of forming a first loop 210 around a handlebar 212 of a craft 214. Likewise, the second portion is capable of forming a second loop 216 around the handlebar. In the embodiments shown, tension exerted on the free end of the first portion causes the first loop to exert an inwardly-directed wrapping force on the handlebar when wrapped therearound. Likewise, tension exerted on the free end of the second portion causes the second loop to exert a wrapping force on the handlebar when wrapped therearound. This is wrapping force is believed to provide the most secure attachment to the handlebar, because the more tension that is applied, the stronger the wrapping forces exerted on the handlebar. Also, the adjustable nature of the first and second loops is easy to put on and take off of the craft. Further, the adjustable nature of the first and second loops allows the anchoring system to be universally usable with virtually any type of craft. Additionally, because the wrapping force exerted by the first and second loops may be about equally distributed about the periphery of the part of the handlebar in contact with the respective loop, the entire periphery of the handlebar shares the tension exerted thereon when the anchoring system is in use.

In this embodiment, the first portion includes a fixed loop 228, where the first loop is formed by wrapping the free end of the first portion around the handlebar and through the fixed loop of the first portion. Likewise, the second portion includes a fixed loop 230 where the second loop is formed by wrapping the free end of the second portion around the handlebar and through the fixed loop of the second portion. The fixed loops can be formed by folding a strap over onto itself and sewing as shown, or by other mechanism. The fixed loops may also comprise individual structures coupled to the first and second portions. Examples of the latter include metal loops, looped straps, etc.

Where the fixed loop is a strap, preferably, the fixed loop of the first portion has a 180° twist therein for urging the fixed loop to lie flat against the handlebar when the first portion is exerting the wrapping, force thereagainst. Similarly, the fixed loop of the second portion preferably has a 180° twist therein for urging the fixed loop to lie flat against the handlebar when the second portion is exerting the wrapping force thereagainst. In this way a more continuous surface is presented to the handlebar, thereby reducing wear on the handlebar. The inventor has also found that the twisted loop provides a tighter grip than if the twist is not present. Note that the twisted loop is also useable if the loops 228, 230 are not fixed.

In a variation, the first and second loops may be manually adjustable, e.g. via a strap and buckle configuration hooks and loops fastener etc. Regardless of the particular implementation, it is desirable that the first and second loops be able to exert a wrapping force on the handlebars so that they are less prone to slipping along the handlebar or off of the grips.

As shown in FIG. 4 the first portion may wrap around a section of the handlebar located between a first grip 222 of the handlebar and a longitudinal center of the handlebar. The second portion wraps around a section of the handlebar located between a second grip 224 of the handlebar and the longitudinal center of the handlebar.

A cross member 226 extends between the first and second portions. The cross member keeps the first and second loops from sliding apart during transportation of the craft. Because the first and second portions are not allowed to significantly slide apart, they less apt to engage the critical components found on or near the handlebar such as throttle and braking lines.

The length of the cross member may be fixed or, preferably, is selectively adjustable. As shown in FIG. 2, the cross member may include two pieces 232, 234 with a coupling device 236 coupling the two pieces together. The coupling device allows selection and adjustment of the length of the cross member. Illustrative coupling devices include a compression fastener (as shown), buckle hooks and loops fastener, button and eyelet. The coupling device may be coupled to one of the pieces at a location distal from a point of coupling of the piece to one of the first and second portions, to both pieces, etc.

In a variation some or all of the cross member may be rigid to prevent the first and second portions from moving inward as well as outward. Such a cross member may, for example, be a socket-type telescoping, member, compression-limited sliding assembly of members etc.

As an option, a guard 238 may be coupled to the cross member, the guard being positionable between the coupling device and a portion of the craft as shown in FIG. 4. The guard protects the craft from scratching and abrasions that might otherwise be caused by contact with the coupling device. The guard may be constructed of any suitable material, including but not limited to a polymeric material, leather, neoprene, etc.

As shown in FIG. 1, the cross member may be fixedly coupled to the first and second portions, and particularly, the first and second loops. In other embodiments, such as those discussed later, the cross member may be selectively positionable along the first and second members. For instance, the cross member may be slidably coupled to the first and second loops such that the cross member is able to slide along at least a portion of a circumference of the first and second loops. This allows the user to position the cross member at a desired position relative to the craft, e.g, in a location where it will not engage the craft in an adverse manner. Preferably, the cross member is able to slide along at least about one eighth of the circumference of the first and second loops when attached to the craft, more preferably at least about one third, and ideally at least about one half the circumference of the first and second loops.

To make the cross member selectively positionable, opposite ends of the cross member may have loops that wrap around the first and second loops 228, 230. Another variation has a channel coupled to the first and second loops, while the member has a guide that slides along the channel. In a further variation, one end of the cross member may have a fixed loop, while the other end may have an adjustable loop that, for example, wraps around the second loop, doubles back on itself and is slidably coupled to the main portion of the cross member. Yet another variation of the cross member has two such adjustable loops.

An even further variation has independently created portions coupled to the first and second loops 228, 230 and an adjustable portion extending therebetween. A yet further variation has independently created positions coupled to the first and second loops 228, 230 and a portion extending therebetween, where lengths of the first and or second portions are adjustable.

Figure 5:
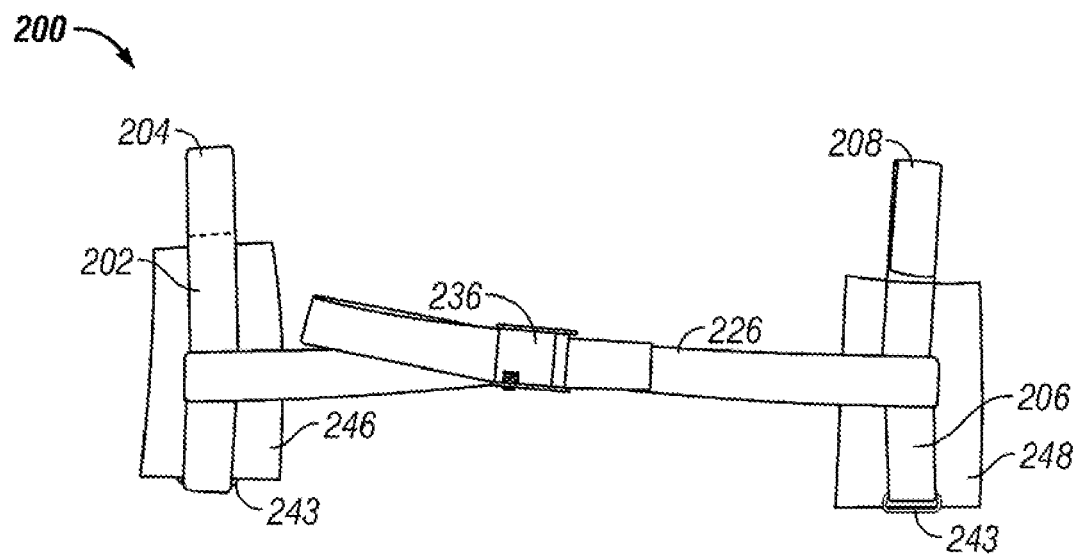
FIG. 5 is a side view of an anchoring system according to one embodiment of the present invention.
Figure 6:
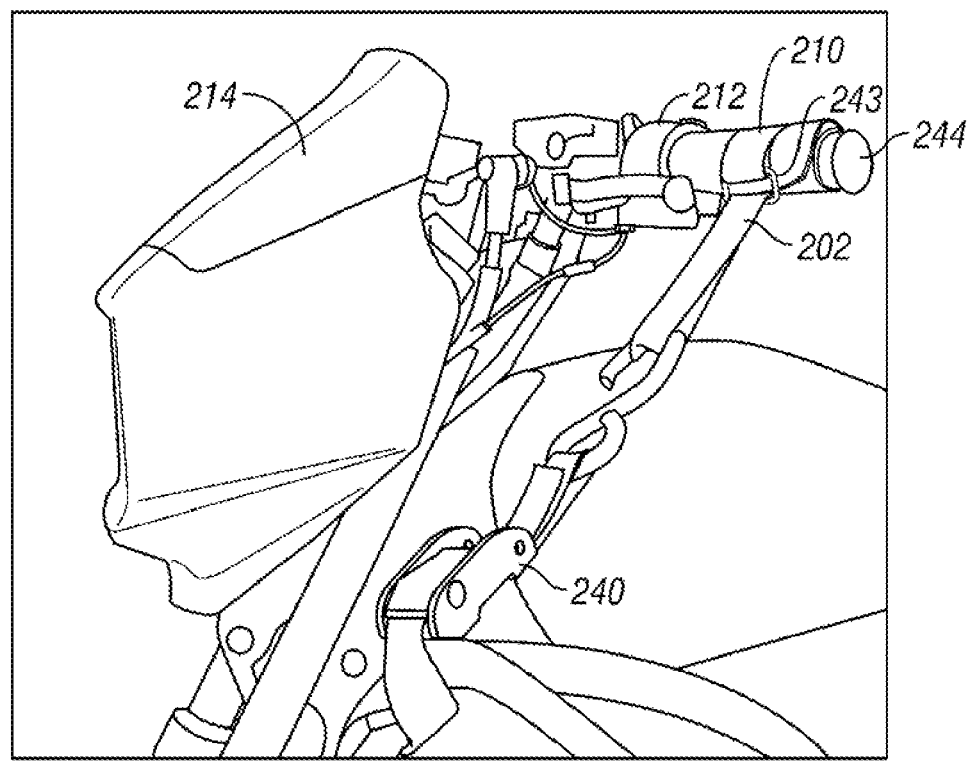
FIG. 6 is a perspective view of the anchoring system of FIG. 5 in use.
Figure 7:
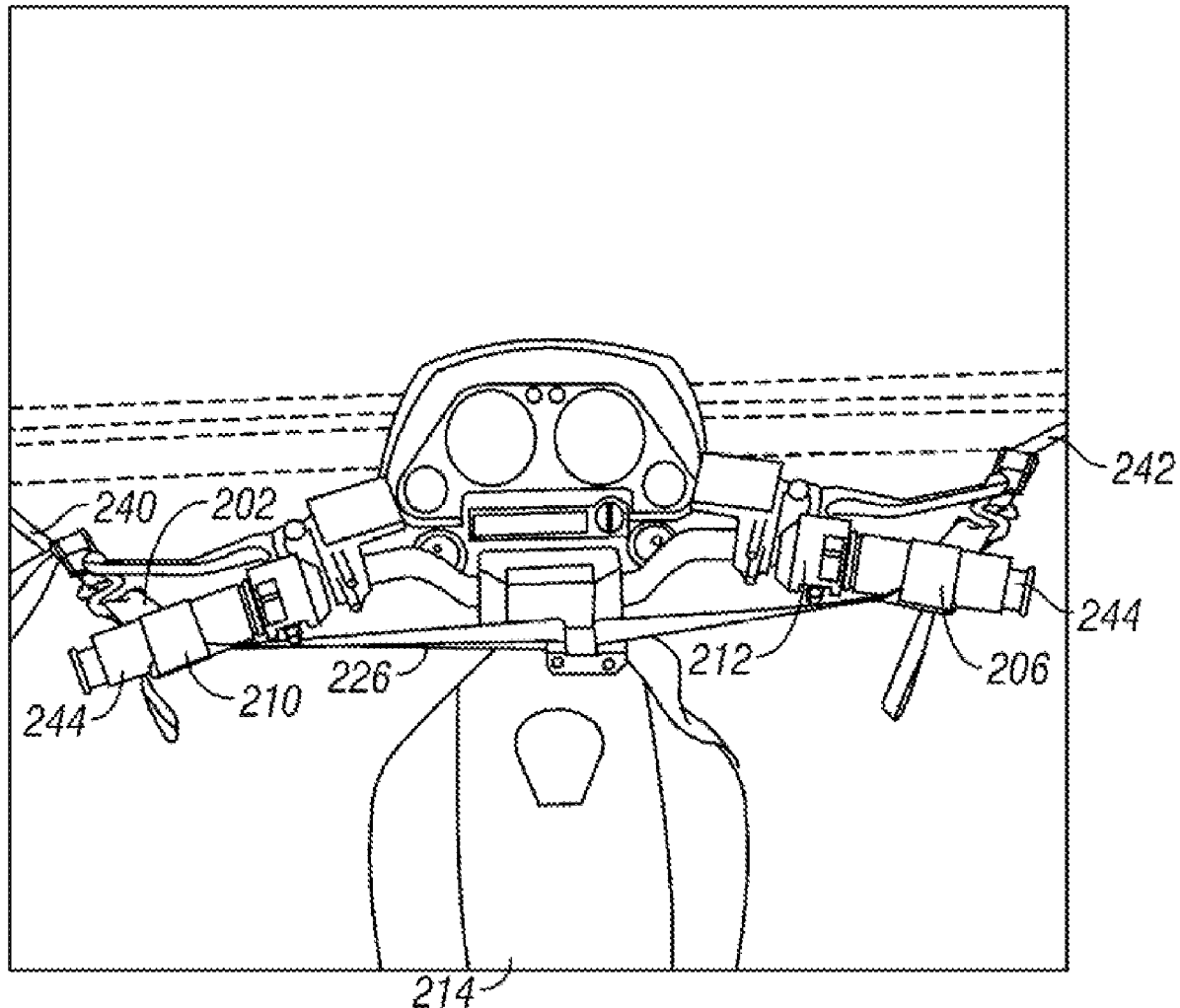
FIG. 7 is a perspective view of the anchoring system of FIG. 5 in use.

FIG. 5 illustrates an anchoring system 200 for a craft according to another embodiment of the present invention. FIGS. 6 and 7 illustrate the anchoring system of FIG. 5 in use. As shown, the anchoring system includes a first portion 202 having a free end 204, and a second portion 206 having a free end 208.

Again, the first portion is capable of forming a first loop 210 around a handlebar 212 of a craft 214 by inserting the free end through a metal loop 243. Likewise, the second portion is capable of forming, a second loop 216 around the handlebar. In the embodiments shown, the loops are wrapped around the grips 244 of the handlebar. Tension exerted on the free ends of the first and second portions causes the first and second loops to exert an inwardly-directed wrapping force on the grips when wrapped therearound. The tension-induced wrapping force exerted by the loops prevents the first and second portions from sliding off of the grips during transportation of the craft.

Preferably, the wrapping force exerted by the first loop is about equally distributed about the periphery of the pan of the handlebar in contact therewith. Likewise, the wrapping force exerted by the second loop is preferably about equally distributed about the periphery of the part of the handlebar in contact therewith. In this way, the impact on the grips is minimized as the force is somewhat distributed about the grip. To further reduce the impact on the grips the of width of the first and second portions along the length of engagement with the grips can be made wider.

To provide additional protection to the grips a first guard 246 may be coupled to the first portion, the first guard being positionable between the first portion and the handlebar when the first portion is wrapped therearound. Likewise, a second guard 248 may be coupled to the second portion the second guard being positionable between the second portion and the handlebar when the second portion is wrapped therearound. The guards may be constructed of any suitable material, including but not limited to a polymeric material, leather, neoprene, etc. A softer guard material such as neoprene is preferred when using the anchoring system directly on the bar of the handlebar (FIG. 4) or with resilient grips (FIG. 6). A more resilient guard material such as semi-rigid plastic may be used to spread the force out, such as where the grips are of a soft foam and subject to tearing.

As above, a cross member 226 extends between the first and second portions. The cross member keeps the first and second loops from sliding, apart during transportation of the craft. Where the anchoring system is used as shown in FIGS. 6 and 7, the cross member is particularly important, as it prevents the first and second member from sliding off the ends of the handlebar.

In use, the anchoring system is placed adjacent to the handlebars. The free ends of the first and second portions are looped around the handlebar and inserted through the loops, rings, etc. Standard tie down straps 240, 242, ropes, chains, etc. may then be coupled to the free ends of the first and second portions, as well as eyelets or hooks in the vehicle or other mechanism to which the craft is being mounted. To this end, the free ends of the members may have loops, eyelets, or other coupling mechanism for coupling to the tie down straps, ropes, chains, etc, The anchoring system may also include integral the down straps, ropes, chains etc. The tie down straps are cinched up to exert tension on the first and second members, thereby fixing the craft in a substantially immovable position.

Materials from which the first and second portions and cross member may be constructed are numerous and not particularly critical to the invention. While it is preferred that the materials for these components be nonabrasive and have limited elasticity, some stretchability may be acceptable. Illustrative materials include nylon or other polymeric straps, leather straps, etc.

Some of the various points of coupling may be permanently fixed, e.g., by sewing, adhesive, rivets, sonic, or thermal bonding, etc. Some of the various points of coupling may also be detachably coupled, e.g., by hooks and loops fasteners, buttons, bolts, bluckles, etc. One skilled in the art will appreciate that the selection of which points of coupling should be permanent and which should be detachable will depend on the particular permutation of the invention being designed.

Accordingly, with respect to the above description, it is to be realized that the optimum dimensional relationships for the parts of the invention, to include variations in size, materials, shape, form, function and manner of operation, assembly and use are deemed readily apparent and obvious to one skilled in the art and all equivalent relationships to those illustrated in the drawings and described in the specification are intended to be encompassed by the present invention.

While various embodiments have been described above, it should be understood that they have been presented by way of example only and not limitation. Thus, the breadth and scope of a preferred embodiment should not be limited by any of the above-described exemplary embodiments, but should be defined only in accordance with the following claims and their equivalents.

What is claimed is:

1. An anchoring system for a craft, comprisinig:
   a first portion for forming a first loon around a handlebar, the first portion having a free end;
   a second portion for forming a second loop around the handlebar, the second portion having a free end; and
   a cross member extending between the first and second portions, wherein a length of the cross member is selectively adjustable;
   wherein tension exerted on the free end of the first portion causes the first loop to exert a wrapping force on the handlebar when wrapped therearound;
   wherein tension exerted on the free end of the second portion causes the second loop to exert a wrapping force on the handlebar when wrapped therearound,
   wherein the first portion includes a fixed loop, wherein the first loop is formed by wrapping the free end of the first portion around the handlebar and through the fixed loop of the first portion, wherein the second portion includes a fixed loop, wherein the second loop is formed by wrapping the free end of the second portion around the handlebar and through the fixed loop of the second portion.

2. An anchoring system as recited in claim 1, wherein the first portion wraps around a section of the handlebar located between a first grip of the handlebar and a longitudinal center of the handlebar, wherein the second portion wraps around a section of the handlebar located between a second grip of the handlebar and the longitudinal center of the handlebar.

3. An anchoring system as recited in claim 1, wherein the wrapping force exerted by the first loop is about equally distributed about a periphery of a part of the handlebar in contact therewith, wherein the wrapping force exerted by the second loop is about equally distributed about a periphery of a part of the handlebar in contact therewith.

4. An anchoring system as recited in claim 1, wherein the fixed loop of the first portion has a twist therein for urging the fixed loop of the first portion to lie flat against the handlebar when the first portion is exerting the wrapping force thereagainst, wherein the fixed loop of the second portion has a twist therein for urging the fixed loop of the second portion to lie flat against the handlebar when the second portion is exerting the wrapping force thereagainst.

5. An anchoring system as recited in claim 1, wherein the cross member includes two pieces and a coupling device coupling the two pieces together, wherein the coupling device allows selecting a length of the cross member.

6. An anchoring system as recited in claim 5, wherein the coupling device is coupled to one of the pieces at a location distal from a point of coupling of the piece with one of the first and second portions.

7. An anchoring system as recited in claim 5, further comprising a guard coupled to the cross member, the guard being positionable between the coupling device and a portion of the craft.

8. An anchoring system as recited in claim 1, wherein the cross member is selectably positionable along at least one section of the first and second loops.

9. An anchoring system as recited in claim 1, wherein the first portion wraps around a first grip of the handlebar, wherein the second portion wraps around a second grip of the handlebar.

10. An anchoring system as recited in claim 1, wherein the cross member is rigid for limiting the first and second portions in directions towards and away from each other.

11. An anchoring system as recited in claim 1, further comprising a first guard coupled to the first portion, the first guard being positionable between the first portion and the handlebar when the first portion is wrapped therearound; and further comprising a second guard coupled to the second portion, the second guard being positionable between the second portion and the handlebar when the second portion is wrapped therearound.

12. An anchoring system for a craft, comprising:
a first portion for forming a first loop around a handlebar, the first portion having a free end;
a second portion for forming a second loon around the handlebar, the second portion having a free end; and
a cross member extending between the first and second portions, wherein a length of the cross member is selectively adjustable;
wherein tension exerted on the free end of the first portion causes the first loop to exert a wrapping force on the handlebar when wrapped therearound;
wherein tension exerted on the free end of the second portion causes the second loop to exert a wrapping force on the handlebar when wrapped therearound,
wherein the cross member is selectably positionable along at least one section of the first and second loops,
wherein the cross member is slidably coupled to the first and second loops such that the cross member is able to slide along at least a portion of the first and second loops.

13. An anchoring system as recited in claim 12, wherein the first portion wraps around a first grip of the handlebar, wherein the second portion wraps around a second grip of the handlebar.

14. An anchoring system as recited in claim 12, wherein the cross member is rigid for limiting the first and second portions in directions towards and away from each other.

15. An anchoring system as recited in claim 12, further comprising a first guard coupled to the first portion, the first guard being positionable between the first portion and the handlebar when the first portion is wrapped therearound; and further comprising a second guard coupled to the second portion; the second guard being positionable between the second portion and the handlebar when the second portion is wrapped therearound.

16. An anchoring system as recited in claim 12, wherein the first portion wraps around a section of the handlebar located between a first grip of the handlebar and a longitudinal center of the handlebar, wherein the second portion wraps around a section of the handlebar located between a second grip of the handlebar and the longitudinal center of the handlebar.

17. An anchoring system as recited in claim 12, wherein the wrapping force exerted by the first loop is about equally distributed about a periphery of a part of the handlebar in contact therewith, wherein the wrapping force exerted by the second loop is about equally distributed about a periphery of a part of the handlebar in contact therewith.

18. An anchoring system as recited in claim 12, wherein the first portion includes a fixed loop, wherein the first loop is formed by wrapping the free end of the first portion around the handlebar and through the fixed loop of the first portion, wherein the second portion includes a fixed loop, wherein the second loop is formed by wrapping the free end of the second portion around the handlebar and through the fixed loop of the second portion.

19. An anchoring system as recited in claim 18, wherein the fixed loop of the first portion has a twist therein for urging the fixed loop of the first portion to lie flat against the handlebar when the first portion is exerting the wrapping force thereagainst, wherein the fixed loop of the second portion has a twist therein for urging the fixed loop of the second portion to lie flat against the handlebar when the second portion is exerting the wrapping force thereagainst.

20. An anchoring system as recited in claim 12, wherein the cross member includes two pieces and a coupling device coupling the two pieces together, wherein the coupling device allows selecting a length of the cross member.

21. An anchoring system as recited in claim 20, wherein the coupling device is coupled to one of the pieces at a location distal from a point of coupling of the piece with one of the first and second portions.

22. An anchoring system as recited in claim 20, further comprising a guard coupled to the cross member, the guard being positionable between the coupling device and a portion of the craft.

* * * * *